(12) United States Patent
Bassi et al.

(10) Patent No.: US 8,619,248 B2
(45) Date of Patent: Dec. 31, 2013

(54) SYSTEM AND METHOD FOR CALIBRATING ULTRA WIDE-ANGLE LENSES

(75) Inventors: Zorawar Singh Bassi, Markham (CA); Ashkan Alavi-Harati, Richmond Hill, CA (US)

(73) Assignee: Geo Semiconductor Inc., Santa Clara, CA (US)

( * ) Notice: Subject to any disclaimer, the term of this patent is extended or adjusted under 35 U.S.C. 154(b) by 76 days.

(21) Appl. No.: 13/440,031

(22) Filed: Apr. 5, 2012

(65) Prior Publication Data

US 2013/0265571 A1    Oct. 10, 2013

(51) Int. Cl.
*G01B 9/00* (2006.01)

(52) U.S. Cl.
USPC .......................................................... 356/127

(58) Field of Classification Search
USPC ................................................ 356/124, 127
See application file for complete search history.

(56) References Cited

U.S. PATENT DOCUMENTS

| | | | |
|---|---|---|---|
| 5,631,778 A * | 5/1997 | Powell | 359/724 |
| 6,954,310 B2 * | 10/2005 | Holloway et al. | 359/619 |
| 7,084,904 B2 * | 8/2006 | Liu et al. | 348/218.1 |
| 7,646,404 B2 * | 1/2010 | Liu et al. | 348/218.1 |
| 8,358,317 B2 * | 1/2013 | Carlson | 345/582 |
| 2013/0016918 A1 * | 1/2013 | Haribhatt et al. | 382/275 |

FOREIGN PATENT DOCUMENTS

WO    WO2009069996    *    6/2009    ............ H04N 5/262

* cited by examiner

*Primary Examiner* — Roy M Punnoose
(74) *Attorney, Agent, or Firm* — Sughrue Mion, PLLC

(57) ABSTRACT

Systems and methods for obtaining mapping of Ultra Wide-Angle (UWA) lenses are disclosed. Captured image of a set of grid points on the inner surface of a precision made calibration dome is used as an input image. Image processing techniques are used to identify components of the image and compute the lens mapping. The lens mapping can be used to calibrate the lens against a standard or against other lenses. The mapping can further be used for perspective correction applications.

22 Claims, 6 Drawing Sheets

System set-up 30

SYSTEM AND METHOD FOR CALIBRATING ULTRA WIDE-ANGLE LENSES

FIELD OF INVENTION

The embodiments described herein relate generally to electronic image processing, and specifically to mapping and calibration of Ultra Wide-Angle lenses.

BACKGROUND

Wide-angle lenses are commonly used in monitoring cameras and other image and video capture devices, where a large viewing angle is required. Although there is no universal definition of what constitutes a wide-angle lens, a viewing angle or Field of View (FOV) of approximately 100°-140° would be considered wide for the purpose of the present invention. Beyond about 100°, perspective distortions begin to appear in the image. Especially, there exist so-called Ultra Wide-Angle (UWA) lenses, with even larger Field of Views that can be up to or even greater than 180°. Image capture systems equipped with UWA lenses are used in many applications: surveillance and security monitoring cameras, video-conferencing systems, robotic vision systems, specialty photographic cameras, and vehicle camera systems, amongst others.

It is well known that images taken with UWA lenses exhibit significant amount of perspective distortions, also commonly known as fisheye distortions. When the image is displayed on a planar surface, straight lines would look skewed and curvilinear, more noticeably so for the objects farther away from the center of the lens. Moreover, the relative sizes of objects closer to the lens look exaggeratingly larger, so that different parts of an object appear out of proportion and perspective. It is also known that the perspective distortions are inherent in the mapping geometry, in a sense that they don't stem from any lens or system imperfection. These are a consequence of geometrically mapping a very wide FOV ($>=180°$) in the real world three dimensional (3D) space, to a two dimensional (2D) image space, that is an intrinsic feature of the lens.

How a UWA lens maps points in the 3D object space to the 2D image space will be referred to as the lens' mapping behavior or, in terms of a mathematical description, as the lens mapping. Identifying the lens mapping is a key step in calibrating a lens. The mapping is known a priori only in special cases, where the lens has a simple geometry or the mapping is provided by the manufacturer; otherwise the mapping must be determined. Further, to achieve a large angular FOV, manufactures may use a combination of several lenses or other optics. Yet further, mass produced UWA lenses most likely exhibit slight differences from lens to lens. It would be beneficial to be able to calibrate one lens against an ideal or standard behavior, or to calibrate lenses against one another.

Traditional calibration methods of using calibration test patterns comprising precisely positioned objects (lines, circles, rectangles, etc.) on a flat surface are generally not a viable approach for determining the mapping behavior of UWA lenses. A flat surface has limited field of view (<180°) that cannot cover full FOV of the lens.

Most existing prior art solutions for determining the lens mapping are models based on certain assumptions. For example, the ray optics of a real UWA lens can be traced and modeled in software. Thus, any deviation from the expected behavior can be calculated and corrected for. Another solution consists of direct measurement of a number of coordinates on a calibration target to compare against the observed image of the same coordinates and finding actual characteristic of the lens, such as focal length, and lens centroid. Such an approach requires time consuming measurements and expensive precision tools, e.g. an optical bench and/or a laser beam. Furthermore, this approach does not characterize the mapping behavior of the UWA lens, which may be needed in perspective correction applications.

The present approach utilizes mathematics of UWA lenses as an approximation of the expected behavior of the lens, and a custom design three dimensional test pattern in order to determine the precise lens mapping. Once the lens mapping is characterized, deviations from an ideal or standard behavior can be corrected using any known correction techniques. Also deviations between different lenses, that are supposed to be behaving the same, can be removed. In addition to lens calibration, the UWA lens maps can be supplied to systems that intend to correct for perspective distortions caused by the lens. For example, the co-pending patent application PCT/US2012/27189 discloses methods for perspective correction of UWA lenses, where the lens mapping transformation must be known.

SUMMARY

The embodiments described herein provide in one aspect, a method for obtaining image mapping of an Ultra Wide-Angle (UWA) lens, having an optical axis and a field of view, said method comprising: installing a calibration dome, wherein said dome has an axis of symmetry, a ring shaped base, and an inner surface graded with a plurality of markers; placing the lens at the center of the base facing the calibration dome, such that the optical axis of the lens coincides with the axis of symmetry of the dome and the field of view of the lens is encompassed by the dome; capturing a picture of the inner surface of the calibration dome through the UWA lens; identifying image of each of the plurality of markers in the picture; computing centroid of the image of each of the plurality of markers; and fitting coordinates of the centroids to a functional basis.

The embodiments described herein provide in another aspect a system for obtaining image mapping of an Ultra Wide-Angle (UWA) lens, having an optical axis and a field of view, said system comprising: a calibration dome having an axis of symmetry, and comprising a ring shaped base and a inner surface graded with a plurality of markers; a capture device comprising the UWA lens, an image sensor, and a unit coupled to the image sensor to acquire input image data; and a computing device equipped with means for identifying image of each of the plurality of the markers, computing their centroids and fitting coordinates of the centroids to a functional bases; wherein the capture device is placed in front of the dome such that the lens is at the center of the ring base, with its optical axis coinciding with the axis of symmetry of the dome and its field of view is encompassed by the dome.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

Figure 1:
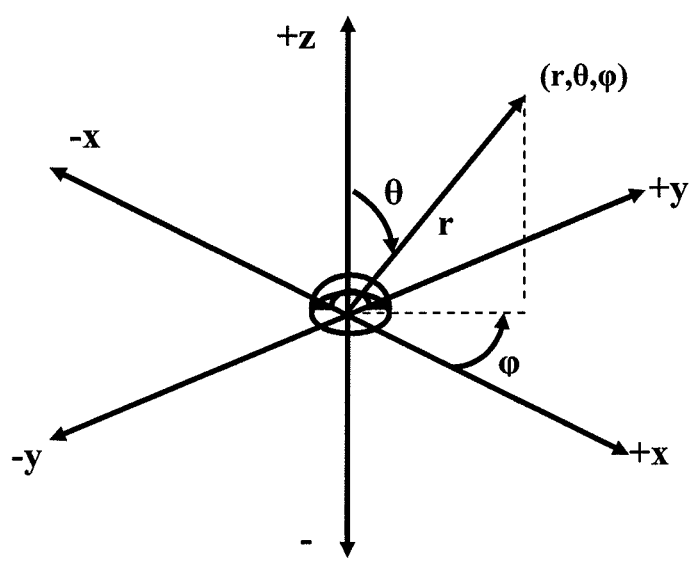
FIG. 1 illustrates the notation used in the embodiments for Cartesian and spherical coordinate systems.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

A typical capture system comprises at least a lens for focusing a captured image onto the image plane of the lens, and an image sensor for converting the optical signals to electronic digital signals. In the realm of digital imaging, the majority of image sensors are CCD and CMOS. In order to calibrate an Ultra Wide-Angle (UWA) lens, detailed knowledge of mapping an image obtained through the UWA lens from a 3D real scene to the 2D image sensor is needed. This is referred to as the lens mapping or lens mapping equation when described in mathematical from. Having this information, one would be able to perform calibration (against an ideal behavior) on a lens that is subject to variations, for example as a result of aging, environmental changes, etc. Alternatively, a group of slightly different UWA lenses made by the same manufacturer could be calibrated against each other to eliminate or significantly reduce the differences. The lens mapping also allows correcting for perspective distortion. Except for simple lenses, the mapping is most often unknown; hence it should somehow be modeled or identified experimentally.

According to one embodiment of the present invention, test patterns on curved surfaces of 3D objects are used to obtain the lens mapping information. The most natural surfaces to map images taken by UWA lenses are the inner surface of dome shaped structures capable of enclosing wide viewing angles; such as spheres, ellipsoids or paraboloids. This approach allows capturing of data points from the full UWA lens field of view. In addition, as will be shown, such surfaces map to the 2D image plane under a wide range of UWA lenses.

FIG. 1 shows the mathematical transformation from spherical coordinates $(r,\theta,\phi)$ to Cartesian coordinates $(x,y,z)$ in the three dimensional (3D) space, wherein a point with radial distance $(r)$, azimuth angle $(\phi)$ and polar angle $(\theta)$ transforms as follows:

$$x = r \sin\theta \cos\phi, \; y = r \sin\theta \sin\phi, \; z = r \cos\theta \quad (1)$$

The coordinates $(r,\theta,\phi)$ and $(x,y,z)$ lie in the 3D real world scene space that is being captured by the UWA lens. For notational consistency, the UWA lens is assumed to be located at the origin, looking up towards the +z axis; the z-axis being therefore the optical axis. This is illustrated in FIG. 1, along with the coordinate convention. The coordinates in the 2D image space, as a result of the capture process, will be denoted either $(u,v)$ or their polar equivalent $(r',\phi')$; the two being related by:

$$u = r' \cos\phi', \; v = r' \sin\phi' \quad (2)$$

The majority of UWA lenses capture 2D images with a circular or an ellipse-type shape. This being since UWA lenses are designed to capture light along conical surfaces centered about the optical axis, which form circles, ellipses, etc, when intersected with a 2D plane perpendicular to the optical axis. As such, it is more useful to work with spherical (polar in 2D) coordinates. Because of the conical behavior, the FOV of a UWA lens can be defined as:

$$FOV = 2\theta_{max}(\phi) \quad (3)$$

where $\theta_{max}$ is the maximum polar angle the UWA lens can capture which may depend on $\phi$. For most lenses $\theta_{max}$ is independent of $\phi$, nevertheless the embodied methods allow for a $\phi$ varying $\theta_{max}$. The lens mapping takes the form:

$$r' = F_r^l(r,\theta,\phi) \quad (4)$$

$$\phi' = F_\phi^l(r,\theta,\phi)$$

Equation (4) simplifies for the majority of UWA lenses, again due to their conical behavior, to the following;

$$r' = F_r^l(\theta,\phi) \quad (5)$$

$$\phi' = F_\phi^l(\theta,\phi)$$

Equation (5) basically indicates that the UWA lens mapping is independent of the radial distance, only depending on the angles. In the description that follows, we first consider (5) and then discuss how it can be generalized to (4). In case of a circular image UWA lens, the ideal lens mapping is as follows:

$$r' = F_r^{li}(\theta,\phi) = \alpha\theta \quad (6)$$

$$\phi' = F_\phi^{li}(\theta,\phi) = \phi$$

Here $\alpha$ is a constant and the superscript i stands for "ideal" map. Equation (6) is the behavior most often circular fisheyes are designed towards.

Figure 2:
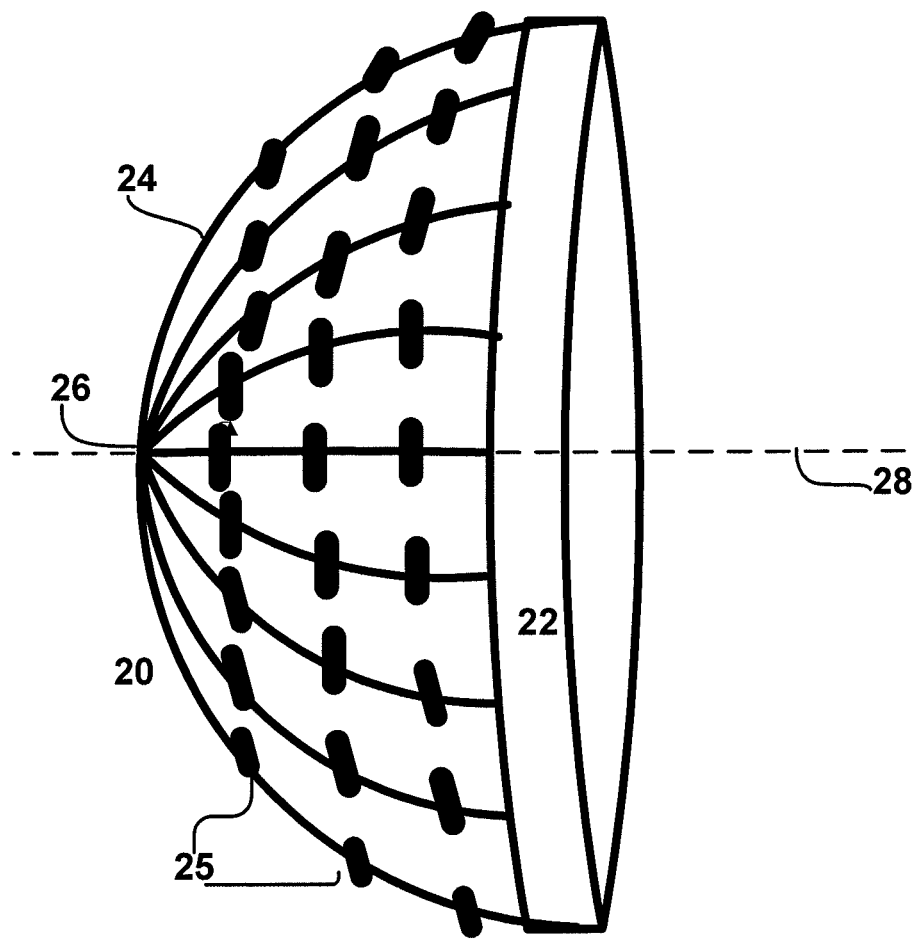
FIG. 2 illustrates an exemplary calibration dome in the form of a hemisphere.

In one exemplary embodiment, as illustrated in FIG. 2, a spherical dome structure 20 is built with high precision machined pieces of wood. It consists of a circular ring shaped base 22 as the equator, and a number of arcs 24 that stretch from the base 22 to the pole 26. The arcs form great circles, or lines of longitude, on the dome and preferably evenly divide the 360° of the circular base. The structure is preferably covered with a non-reflective material as the surface of the hemisphere. When assembled, the structure forms a hemispherical dome ($\theta_{max}=90°$) having an axis of symmetry 28 that goes through the pole 26 and the center of the base 22. The 16 arcs, in this exemplary dome structure, are spaced precisely 22.5° from each other (azimuth direction). Further, each arc 24 has been precisely divided into 9 pieces, including a division at the base 22 and a division at the pole 26, 11.25° apart (polar direction). The division is by means of cross-hair type wood markers, which will be referred to as arc markers 25. Therefore, effectively the inner (curved) surface of the hemi-spherical dome is graded with a 2D grid at $\phi=(22.5°)\times n$, $n=0\ldots 16$ and $\theta=(11.25°)\times m$, $m=0\ldots 8$; the points $n=0$ and $n=16$ correspond to the same azimuth angle. This provides a test pattern as $(\theta,\phi)$ grid of 9×17 points at the arc markers; where the arcs identified by $\phi$, and the markers on each arc by $\theta$. The radius of the dome was taken to be 15 inches for this exemplary dome while any size could be used provided the dome image captured by the UWA lens is in a reasonably good focus. A finer structure is preferably used for finer grids and higher accuracy. The exemplary dome 20 is suitable for FOV of <=180°; for larger FOV, the dome can be extended to beyond a hemisphere with $\theta_{max}>90°$. A different surface can also be used, such as a partial ellipsoid, provided the surface fully encompasses the UWA lens FOV. For construction purposes, a half-sphere is the simplest.

Figure 3:
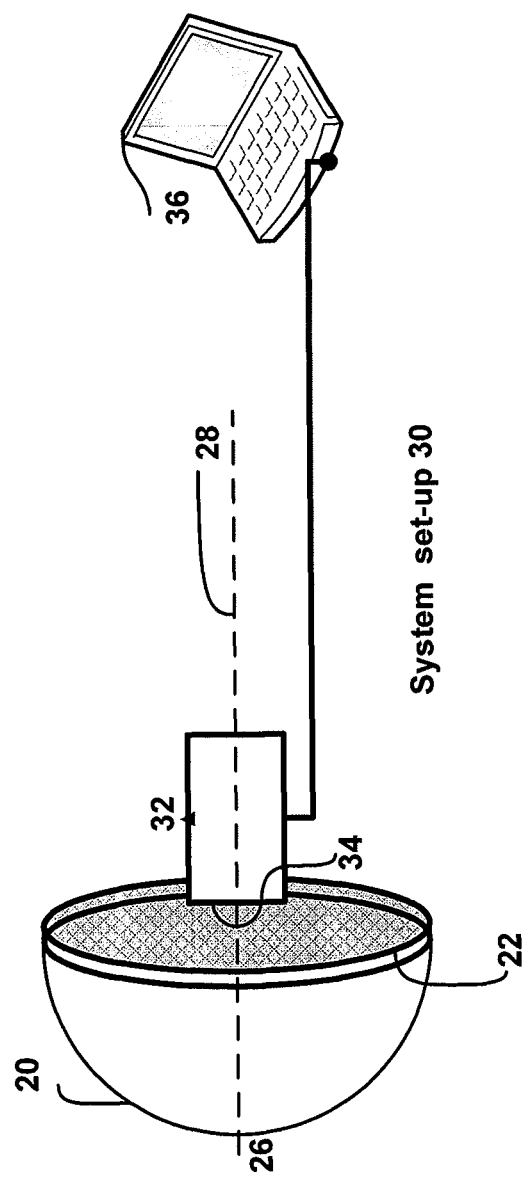
FIG. 3 illustrates an exemplary setup for capturing image of a test pattern on the inner surface of the calibration dome, and sending to a computational device.

According to one embodiment, as illustrated in FIG. 3, a calibration system 30 is set up to obtain and characterize the lens mapping. A capture device (e.g. a monitoring camera) 32 equipped with a UWA lens 34 is placed in front of the dome 20, with the lens at the center of the base 22 facing the inner surface of the dome along the z-axis, directly towards the pole 26. In this configuration, the optical axis of the lens coincides with the axis of symmetry of the dome 28, and the field of view of the lens is encompassed by the dome. The UWA lens therefore images the $(\theta,\phi)$ grid, formed by the arcs 24 and markers 25 on the inner dome surface. This pre-processed image is referred to as the input image. Depending on the type of device 32, the image can be dynamic (video monitoring) or taken as a snapshot. The dome's inner surface, as graded and marked, functions as a test pattern used to analyze the mapping behavior. All capture devices further comprise an image sensor that convert the input image into digital data containing image information for image pixels. Some devices (such as monitoring cameras) also have a unit coupled to the image sensor that acquires the input image data for display, recording, etc., either as a built-in or as a separate unit. Alternatively, the image acquisition unit may be a graphic card inside a computer instead of the capture unit. Either way, the input image data needs to be delivered to a computing device 36 for processing.

Figure 4:
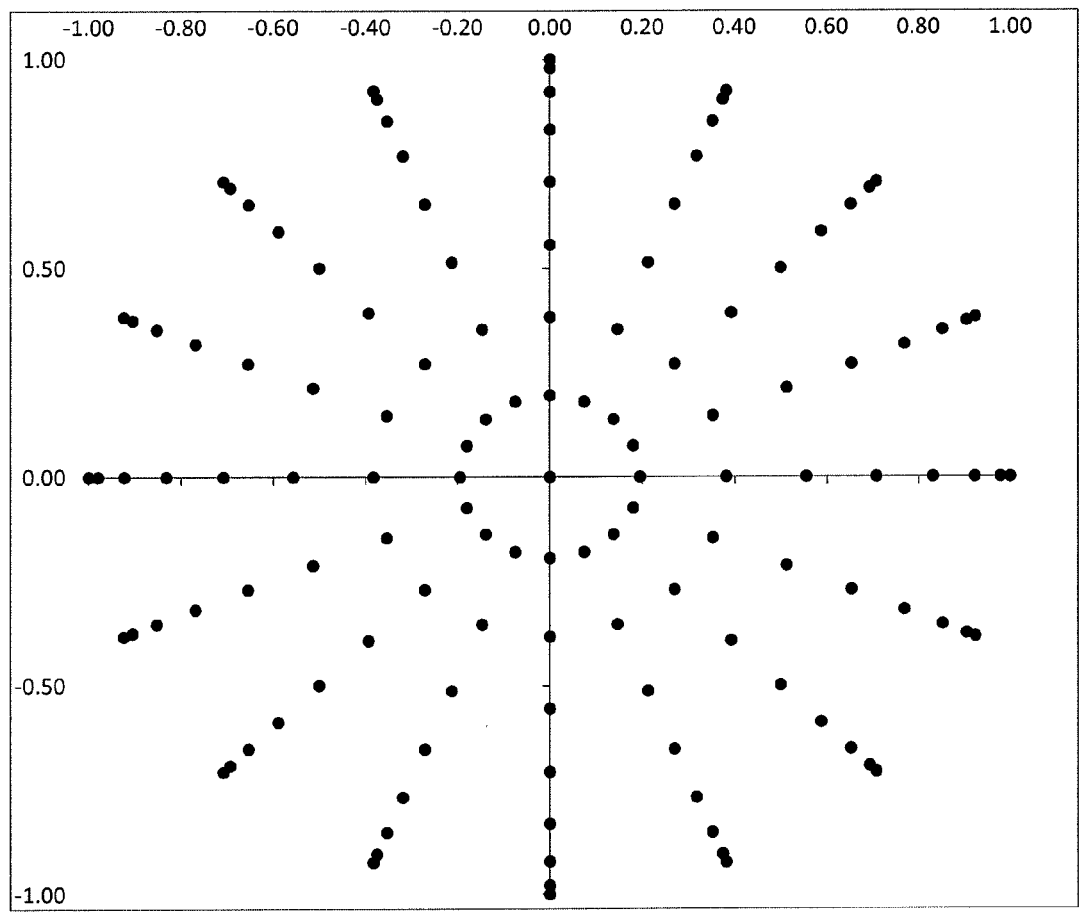
FIG. 4 illustrates projection of an exemplary test pattern of equiangular circular markers as projected on the base plane of a sphere.

FIG. 4 shows the geometrical projection of the grid points, as selected above, formed on the base (x-y plane in FIG. 1) in accordance with equation (1). Image dimensions are normalized to unity in FIG. 4. The constant $\phi$ arcs are projected as radial lines. The grid points (identified by black markers) on the inner surface of the dome are now mapped to the intersections of the radial lines and the concentric circles corresponding to a constant $\theta$. If a circular UWA lens with FOV of 180° is placed at the center of the base, with its optical axis coinciding the axis of the dome, ideally it would create an image of the grid points that looked like FIG. 4. In general, UWA lenses do not form circular images; this may be either by design or due to distortion. Also the FOV of the lens may be smaller or greater than 180°. That means the mapping of FIG. 4 is not generally available.

According to one embodiment, mapping for a UWA lens of any shape is determined by extracting the $(r',\phi')$ positions of the actual $(\theta,\phi)$ grid markers in the captured image. This requires that the marker positions be visible in the captured image. To ensure this, the markers should be made distinguishable from the surrounding arc structure. In one experiment, a set of small circular white reflective stickers were attached to the dome at the grid marker positions. Alternatively, one may pre-install small light sources (e.g. LEDs) at the grid point in order to make the set-up less susceptible to the surrounding lighting. To ensure sufficient contrast with the surrounding structure, the stickers were surrounded by black tape. Preferably, the dome structure is painted with a non-reflective black color for improved contrast. Let's label the known $(\theta,\phi)$ grid of the exemplary dome as follows:

$$(\theta_m,\phi_n)=(m\Delta\theta,n\Delta\phi) \quad (7)$$

$$\Delta\theta=11.25°, \Delta\phi=22.5°$$

These grid points correspond to the centers of the markers (in the current example, the small circular stickers). The markers will be captured by the UWA lens onto a 2D image with corresponding $(u,v)$ or $(r',\phi')$ coordinates. The $(u,v)$ coordinates can be determined by computing the centroids of the markers in the 2D image. Note that the image of the circular markers will no longer be circles in general, especially for markers far from the center; hence centroids of the image of a mark would be the best approximation of the corresponding grid point on the dome.

Figure 5:
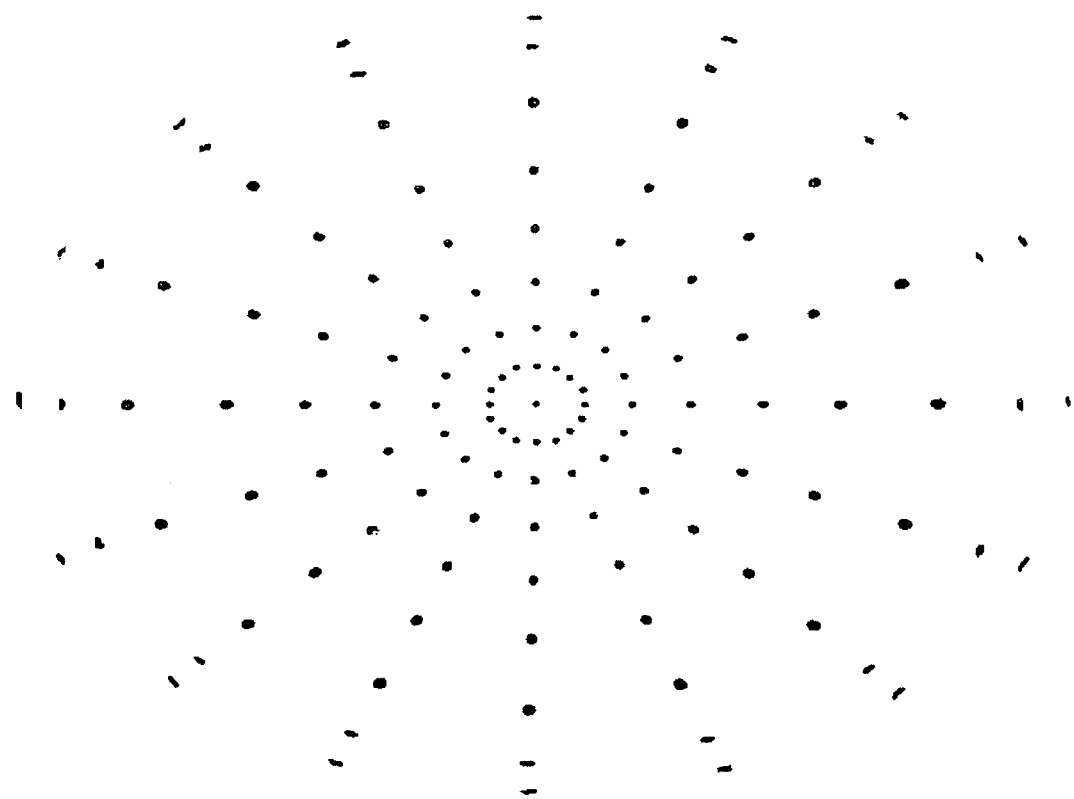
FIG. 5 illustrates the image of an exemplary test pattern in shape of equiangular circular markers as acquired through a UWA lens and processed, in accordance with an embodied method.

Automatic computation of centroids is greatly simplified in a binary (black and white) image. With sufficient contrast, a local thresholding procedure can bring the captured image to a binary, in which case the markers are seen as small connected white regions and the rest of the image is pushed to black. FIG. 5 shows an example of an image that has been turned into a binary mage by thresholding, specifically for a UWA lens that images the output as an ellipse. The image has been inverted for color in FIG. 5 for the purpose of printing on a white paper. The markers are seen as small round regions (more non-circular away from the center), with the rest of the image thresholded to black (inverted to white). Thresholding is a standard image processing function, widely described in the art, and can be readily implemented in software. Once having obtained a binary image, the centroid of each distinct white region is the pixel center of mass for that region, basically a $(u,v)$ coordinate.

The computed centroids also need to be uniquely identified against the corresponding $(\theta_m,\phi_n)$ grid points. Various methods can be adapted to accomplish this. Using one exemplary algorithm, the pole marker $(\theta=\theta_0=0)$ is identified first. From the center, moving outwards the next ring or markers $(\theta=\theta_1)$ is identified by looking for the closest regions that form concentric circles or ellipses, which is the most common scenario for UWA lenses. The process continues until all rings of $\theta_m$ have been identified, including whether there is a missing ring. Next the identification in $\phi_n$ is made for each group of $\theta_m$ markers by starting with the most horizontal marker (relative to the center) identified as $(\phi=\phi_0=0)$ and moving in a clockwise or counterclockwise fashion identifying $\phi_1$ and so forth. A more sophisticated approach is to have distinct features on the dome for each marker, which is also imaged. Then identifying the unique features automatically identifies the associated $(\theta_m,\phi_n)$ grid point. Roughly speaking, the more precise and sophisticated the calibration dome and the more controlled the surrounding lighting, the simpler the algorithm needs to be. Otherwise, more complex pattern recognition techniques may be required to be implemented. Therefore, it will be appreciated by those skilled in the art that several approaches are possible for marker identification and centroid computation.

Having computed and identified the marker positions in the 2D captured image, one gets a numerical mapping of grid points from $(\theta,\phi)$ to $(u,v)$:

$$(\theta_m,\phi_n) \rightarrow (u_{mn},v_{mn}) \quad (8)$$

Note that every point $(\theta_m, \phi_n)$ has a unique point $(u_{mn}, v_{mn})$ associated with it, hence the joint mn indices on the right. Using (2), the equivalent grid point mapping for polar coordinates being:

$$(\theta_m, \phi_n) \rightarrow (r'_{mn}, \phi'_{mn}) \quad (9)$$

This data can next be fitted to an appropriate functional basis (polynomial, etc.) to obtain the required lens mapping in (5):

$$(\theta_m, \phi_n) \rightarrow (r'_{mn}, \phi'_{mn}) \xrightarrow{Fitting} \begin{cases} r' = F_r^l(\theta, \phi) \\ \phi' = F_\phi^l(\theta, \phi) \end{cases} \quad (10)$$

The fitting can be done using the standard least squares method, as discussed for example in U.S. Pat. No. 7,324,706. Equations (10) can also be inverted to obtain the inverse lens mapping equation, from $(r', \phi')$ to $(\theta, \phi)$:

$$\theta = F_r^{l^{-1}}(r', \phi') \quad (11)$$

$$\phi = F_\phi^{l^{-1}}(r', \phi')$$

All practical lenses have continuous well behaved lens mapping equations, which allow inversion to obtain the inverse lens mapping equations. Note that (11) cannot determine the radial coordinate r indicating the distance to the 3D point, but only the angular position. Further, note that the described method is valid for any UWA lens, regardless of captured image shape (circular, elliptical, etc.), as long as the surface is appropriately constructed to cover the lens FOV.

The above discussion assumes a lens mapping equation (5) with no radial dependence. This is true for all practical UWA lenses. However, it is possible to extend the method described to determine a lens mapping equation of the general form (4), or to verify that there is no radial dependence. Accordingly, instead of a single spherical surface as the test pattern, a series of spherical surfaces with different radii can be used as test patterns. These provide a grid in the full 3D coordinate space:

$$(r_k, \theta_m, \phi_n) = (r_0 + k\Delta r, m\Delta\theta, n\Delta\phi) \quad (12)$$

The series of captured images have the marker positions extracted in the same manner, with the resulting grids now including an r coordinate. Fitting the grid points leads to the lens mapping equation:

$$(r_k, \theta_m, \phi_n) \rightarrow (r'_{kmn}, \phi'_{kmn}) \xrightarrow{Fitting} \begin{cases} r' = F_r^l(r, \theta, \phi) \\ \phi' = F_\phi^l(r, \theta, \phi) \end{cases} \quad (13)$$

Figure 6:
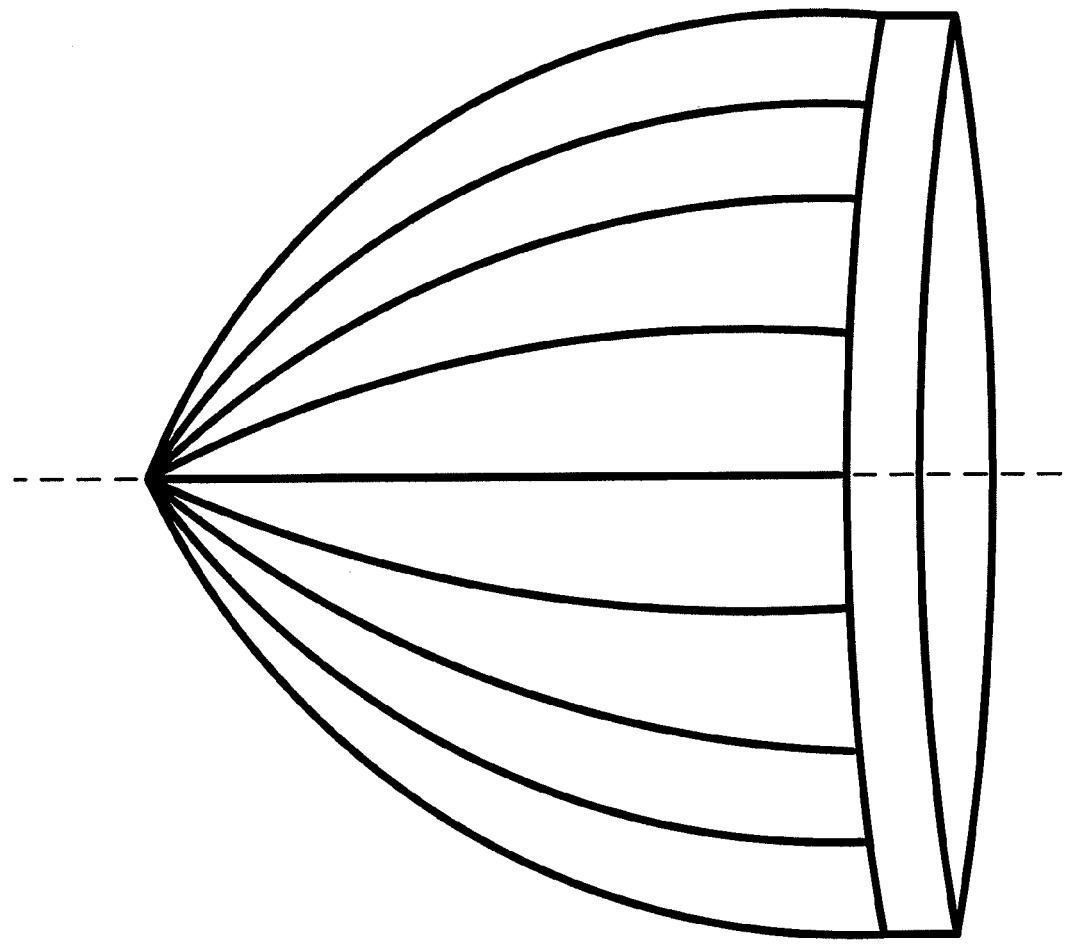
FIG. 6 illustrates an exemplary calibration dome in the form of a partial ellipsoid that is used for radial dependent mappings.

According to an alternative embodiment, a single surface with varying r can be used in place of a series of spherical surfaces. An example would be to use an ellipsoid surface, as depicted in FIG. 6, though its physical construction is more challenging. In practice, constructing (13) to verify no radial dependence is a far more likely scenario than having a UWA lens behaving as such.

Accordingly with the knowledge of the lens mapping equation (13), calibration of a UWA lens to a standard or to another lens can be performed. In one exemplary embodiment, two UWA lenses are considered with lens mapping equations as follows:

$$\text{Lens 1} \begin{cases} r'_1 = F_{r1}^l(r, \theta, \phi) \\ \phi'_1 = F_{\phi 1}^l(r, \theta, \phi) \end{cases} \quad (14)$$

$$\text{Lens 2} \begin{cases} r'_2 = F_{r2}^l(r, \theta, \phi) \\ \phi'_2 = F_{\phi 2}^l(r, \theta, \phi) \end{cases}$$

If lens 1 is expected to have the ideal behavior (6), then the resulting distortion (indicated by superscript D) in the $(r_1', \phi_1')$ image is given by:

$$F_{r1}^D(r_1', \phi_1') = F_{r1}^l F_r^{li^{-1}}(r_1', \phi_1') \quad (15)$$

$$F_{\phi 1}^D(r_1', \phi_1') = F_{\phi 1}^l F_\phi^{li^{-1}}(r_1', \phi_1')$$

Equivalently from the distorted image of lens 1, the corrected image can be obtained by applying the inverse of the distortion (15):

$$(r_1', \phi_1')_{corrected} = (F_{r1}^{D^{-1}}(r_1', \phi_1')_{distorted}, F_{\phi 1}^{D^{-1}}(r_1', \phi_1')_{distorted}) \quad (16)$$

Analogously, to calibrate lens 1 to lens 2, the following adjustment is applied:

$$(r_1', \phi_1')_{Calibrated\ to\ Lens\ 2} = (F_{r12}^{l^{-1}}(r_1', \phi_1')_{Lens\ 1}, F_{\phi 12}^{l^{-1}}(r_1', \phi_1')_{Lens\ 1}) \quad (17)$$

$$F_{r12}^l(r_1', \phi_1') = F_{r1}^l F_{r2}^{l^{-1}}(r_2', \phi_2')$$

$$F_{\phi 12}^l(r_1', \phi_1') = F_{\phi 1}^l F_{\phi 2}^{l^{-1}}(r_2', \phi_2')$$

This will bring the image of lens 1 to match that of lens 2. Equations (17), combined with the individual lens mapping equations, allows calibration of any lens to another.

Given by (16) and (17), one can implement the image transformation in a system comprising one or more UWA lens. For example, the approaches disclosed in U.S. Pat. Nos. 7,324,706 and 7,474,799 can be used. These cited patents discuss hardware efficient means of transforming images, or image warping hardware, starting from a grid or mathematical description as in (16) and (17). Further, the mappings in combination with image warping methods can be used to correct for perspective distortions caused by UWA lenses.

Wide angle lenses can also have their lens mapping determined within the same framework, by treating them as limited UWA lenses with a restricted FOV, of the order 100°~140°. In this case, the lens mapping is essentially a determination of the lens distortion, since wide angle lenses capture planar images, albeit with distortion. The lens map in this case is a plane 2D map between:

$$r' = F_r^l(\tilde{r}, \phi) \quad (18)$$

$$\phi' = F_\phi^l(\tilde{r}, \phi)$$

Here $\tilde{r}$ is the perpendicular radial distance from the marker to the z-axis. In particular this means the test pattern lies in a 2D plane perpendicular to the optical axis, that is, in the focal plane. The same calibration domes, e.g. the exemplary hemispherical dome of FIG. 2 may be used; however since these limited UWA lenses capture at focal planes (rather than across curved geometries) as in a standard camera, the dome markers' perpendicular distances $\tilde{r}$ need to be adjusted by a factor that brings them all to a common plane perpendicular to the z-axis. This is in essence a projection of the dome to a plane. If the lens FOV is $\theta_{max}$, then the corrected distance $\tilde{r}_c$ for a marker at $\theta$ is:

$$\tilde{r}_c = \tilde{r}\frac{\cos\theta_{max}}{\cos\theta} \quad (19)$$

The lens mapping is then determined, analogous to (9) from the data points:

$$(\tilde{r}_{cm}, \phi_n) \rightarrow (r'_{mn}, \phi'_{mn}) \quad (20)$$

The data points on the right are those extracted from the captured image as previously described. Thus, the embodiments include as a special case calibration of wide angle lenses by viewing them as limited UWA lenses and projecting the dome markers to a common plane. Due to this restriction in FOV, it is preferred to have finer grid points that offer more number of markers.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for obtaining image mapping of an Ultra Wide-Angle (UWA) lens, having an optical axis and a field of view, said method comprising:
   installing a calibration dome, wherein said dome has an axis of symmetry, a ring shaped base, and an inner surface graded with a plurality of markers;
   placing the lens at the center of the base facing the calibration dome, such that the optical axis of the lens coincides with the axis of symmetry of the dome and the field of view of the lens is encompassed by the dome;
   capturing a picture of the inner surface of the calibration dome through the UWA lens;
   identifying image of each of the plurality of markers in the picture;
   computing centroid of the image of each of the plurality of markers; and
   fitting coordinates of the centroids to a functional basis.

2. The method of claim 1, wherein the UWA lens is calibrated to a standard mapping by applying a transformation that corrects for deviation of the obtained lens mapping from the standard mapping.

3. The method of claim 1, wherein the UWA lens is calibrated to a second UWA lens by applying a transformation that corrects for deviation of the obtained UWA lens mapping from mapping of the second lens.

4. The method of claim 1, wherein the plurality of markers is positioned on equiangular longitudinal and latitudinal points on the inner surface of the calibration dome.

5. The method of claim 1, wherein the plurality of the markers and the inner surface of the dome are selected with contrasting colors.

6. The method of claim 1, wherein each of the plurality of the markers is a small light source installed inside the dome.

7. The method of claim 1, wherein a thresholding procedure is applied to enhance contrast of the image of the plurality of markers with background.

8. The method of claim 1, wherein the captured picture is converted to a binary image to enhance identification of the image of the plurality of markers.

9. The method of claim 1, wherein the calibration dome is a partial surface of a sphere.

10. The method of claim 1, wherein the calibration dome is a partial surface of an ellipsoid for radial distance dependent lens mapping.

11. The method of claim 1, wherein the field of view of the UWA lens is restricted to represent a wide-angle lens, and the plurality of markers are projected to a plane perpendicular to the optical axis of the lens.

12. A system for obtaining image mapping of an Ultra Wide-Angle (UWA) lens, having an optical axis and a field of view, said system comprising:
   a calibration dome having an axis of symmetry, a ring shaped base and an inner surface graded with a plurality of markers;
   a capture device comprising the UWA lens, an image sensor, and a unit coupled to the image sensor to acquire input image data; and
   a computing device equipped with means for identifying image of each of the plurality of the markers, computing their centroids and fitting coordinates of the centroids to a functional bases;
   wherein the capture device is placed in front of the dome such that the lens is at the center of the ring base, with its optical axis coinciding with the axis of symmetry of the dome and its field of view is encompassed by the dome.

13. The system of claim 12, wherein the UWA lens is calibrated to a standard mapping by applying a transformation that corrects for deviation of the obtained lens mapping from the standard mapping.

14. The system of claim 12, wherein the UWA lens is calibrated to a second UWA lens by applying a transformation that corrects for deviation of the obtained lens mapping from mapping of the second lens.

15. The system of claim 12, wherein the plurality of the markers is positioned on equiangular longitudinal and latitudinal grid points on the inner surface of the calibration dome.

16. The system of claim 12, wherein the plurality of the markers and the inner surface of the dome are selected with contrasting colors.

17. The system of claim 12, wherein each of the plurality of the markers is a small light source installed inside the dome.

18. The system of claim 12, wherein said computing device further applies a thresholding procedure to enhance contrast of the image of the plurality of markers with background.

19. The system of claim 12, wherein said computing device further converts the input image to a binary image to enhance identification of the image of the plurality of markers.

20. The system of claim 12, wherein the calibration dome is a partial surface of a sphere.

21. The system of claim 12, wherein the calibration dome is a partial surface of an ellipsoid for radial distance dependent lens mapping.

22. The system of claim 12, wherein the field of view of the UWA lens is restricted to represent a wide-angle lens, and the plurality of markers are projected to a plane perpendicular to the optical axis of the lens.

* * * * *